United States Patent
Maekawa et al.

(10) Patent No.: US 10,890,892 B2
(45) Date of Patent: Jan. 12, 2021

(54) ABNORMALITY DETERMINATION APPARATUS, NON-TRANSITORY COMPUTER READABLE MEDIUM ENCODED WITH A PROGRAM, ABNORMALITY DETERMINATION SYSTEM AND ABNORMALITY DETERMINATION METHOD

(71) Applicant: FANUC CORPORATION, Yamanashi (JP)

(72) Inventors: Susumu Maekawa, Yamanashi (JP); Hirohide Tsunoda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 159 days.

(21) Appl. No.: 16/254,034

(22) Filed: Jan. 22, 2019

(65) Prior Publication Data

US 2019/0235472 A1    Aug. 1, 2019

(30) Foreign Application Priority Data

Feb. 1, 2018 (JP) ................................. 2018-016179

(51) Int. Cl.
*G06F 11/30* (2006.01)
*G05B 19/4065* (2006.01)
*G05B 19/404* (2006.01)

(52) U.S. Cl.
CPC ....... *G05B 19/4065* (2013.01); *G05B 19/404* (2013.01); *G05B 2219/37428* (2013.01); *G05B 2219/37519* (2013.01)

(58) Field of Classification Search
CPC ................................................ G05B 19/4065
See application file for complete search history.

(56) References Cited

FOREIGN PATENT DOCUMENTS

| JP | 2001-073861 | 3/2001 |
|---|---|---|
| JP | 2005-238399 | 9/2005 |

(Continued)

OTHER PUBLICATIONS

Notification of Reasons for Refusal dated Oct. 8, 2019 in corresponding Japanese Patent Application No. 2018-016179.

(Continued)

*Primary Examiner* — Phuong Huynh
(74) *Attorney, Agent, or Firm* — Wenderoth, Lind & Ponack, L.L.P.

(57) ABSTRACT

An abnormality determination apparatus, which determines abnormality of a temperature sensor in a machine tool, includes: a temperature pattern storage unit which stores a normal pattern indicating temperature change relative to machining time for a machining classification of the machine tool; a temperature data acquisition unit which acquires temperature data outputted by the temperature sensor provided to the machine tool; a machining classification determination unit which determines a machining classification of the machine tool; a comparison data acquisition unit which extracts the normal pattern relative to a determined machining classification from the temperature pattern storage unit; a comparison unit which compares the extracted normal pattern, and as acquired pattern indicating temperature change relative to machining time according to the acquired temperature data; and an abnormality determination unit which determines abnormality of a temperature sensor based on a comparison result.

11 Claims, 5 Drawing Sheets

(56) References Cited

FOREIGN PATENT DOCUMENTS

| | | | |
|---|---|---|---|
| JP | 2006-93180 | | 4/2006 |
| JP | 2008-142844 | | 6/2008 |
| JP | 2008142844 | * | 6/2008 |
| JP | 2008-149415 | | 7/2008 |
| JP | 2009-175793 | | 8/2009 |
| JP | 2009175793 | * | 8/2009 |
| JP | 2012-148629 | | 8/2012 |
| JP | 2015-104765 | | 6/2015 |
| JP | 2015-104765 | * | 8/2015 |
| JP | 2017-135264 | | 8/2017 |

OTHER PUBLICATIONS

Notification of Reasons for Refusal dated Feb. 18, 2020 in corresponding Japanese Patent Application No. 2018-016179.

* cited by examiner

TEMPERATURE PATTERN STORAGE UNIT 130

| MACHINING CLASSIFICATION | ELAPSED TIME | TEMPERATURE DATA |
|---|---|---|

ABNORMALITY DETERMINATION APPARATUS, NON-TRANSITORY COMPUTER READABLE MEDIUM ENCODED WITH A PROGRAM, ABNORMALITY DETERMINATION SYSTEM AND ABNORMALITY DETERMINATION METHOD

This application is based on and claims the benefit of priority from Japanese Patent Application No. 2018-016179, filed on 1 Feb. 2018, the content of which is incorporated herein by reference.

BACKGROUND OF THE INVENTION

Field of the Invention

The present invention relates to an abnormality determination apparatus, a non-transitory computer readable medium encoded with a program, abnormality determination system and abnormality determination method which determine an abnormality in a temperature sensor of a machine tool.

Related Art

In a machine tool, machining dimensional error occurs due to environmental ambient temperature change and heat generation of the machine tool such as cutting heat. For this reason, thermal displacement compensation technology which compensates the machining dimensional error arising due to heating of the machine tool is being used. As technology which compensates the thermal displacement due to heat generation of this machine tool, for example, there is technology which monitors the state of the machine using a plurality of temperature sensors, and estimates the thermal displacement. This generally installs a temperature sensor to the machine tool, and estimates the thermal displacement amount from the output of the temperature sensor. In an FA (Factory Automation) environment in which this temperature sensor is used, abnormalities tend to occur in the temperature sensor compared to normal usages by the influences such as cutting fluid and chips. In the case of there being an abnormality in the temperature sensor, it is not possible to obtain normal temperature output from the temperature sensor. Then, in the case of using the output from an erroneous temperature sensor, it is not possible to estimate an accurate thermal displacement amount, and there is concern over negatively impacting machining.

In the case of an abnormality such as disconnect occurring in the temperature sensor, since the temperature sensor will output an incorrect value, it is possible to determine an abnormality in the temperature sensor. However, even if the temperature sensor outputs an incorrect value due to aging degradation or the like, it is not possible to perform abnormality detection with the temperature sensor or measurement instrument alone. In this regard, for example, Cited Documents 1 to 3 disclose methods for detecting abnormalities in temperature sensors used in the thermal displacement compensation of machine tools. With the methods described in Cited Documents 1 and 2, in the case of arranging a plurality of temperature sensors to a machine tool, and the variation in detected temperatures of the temperatures sensors exceeding a limiting value, or a case of exceeding a limiting value as a result of estimating the outputs of other temperature sensors from the output of one temperature sensor, determines as abnormal. In addition, with the method described in Cited Document 1, a plurality of temperature sensors which measure the temperatures at a plurality of locations is arranged to the machine tool, and for the temperature of a location which is measurable by one temperature sensor, an estimated temperature is calculated based on the measured temperatures of the plurality of other temperature sensors.

Patent Document 1: Japanese Unexamined Patent Application, Publication No. 2008-149415
Patent Document 2: Japanese Unexamined Patent Application, Publication No. 2008-142844
Patent Document 3: Japanese Unexamined Patent Application, Publication No. 2015-104765

SUMMARY OF THE INVENTION

However, with the methods described in Patent Documents 1 to 3, all must arrange a plurality of temperature sensors to the machine tool. In addition, in order to detect abnormality, a technique such that installs a plurality of temperature sensors at the same location has been considered. However, with this technique, the number of temperature sensors or measurement instruments increases, and thus cost rises.

The present invention has an object of providing an abnormality determination apparatus, a non-transitory computer readable medium encoded with a program, abnormality determination system and abnormality determination method which can detect abnormalities in temperature sensors of a machine tool simply without incurring cost.

An abnormality determination apparatus (for example, the "abnormality determination apparatus 100" described later) according to a first aspect of the present invention, which determines abnormality of a temperature sensor (for example, the "temperature sensor 200" described later) in a machine tool (for example, the "machine tool 1" described later), includes: a temperature pattern storage unit (for example, the "temperature storage unit 130" described later) which stores a normal pattern indicating temperature change relative to machining time for a machining classification of the machine tool; a temperature data acquisition unit (for example, the "temperature data acquisition unit 110" described later) which acquires temperature data outputted by the temperature sensor provided to the machine tool; a machining classification determination unit (for example, the "machining classification determination unit 120" described later) which determines a machining classification of the machine tool; a comparison data acquisition unit (for example, the "comparison data acquisition unit 140" described later) which extracts the normal pattern relative to a machining classification determined by the machining classification determination unit from the temperature pattern storage unit; a comparison unit (for example, the "comparison unit 150" described later) which compares the normal pattern extracted by the comparison data acquisition unit, and an acquired pattern indicating temperature change relative to machining time according to the temperature data acquired by the temperature data acquisition unit; and an abnormality determination unit (for example, the "abnormality determination unit 160" described later) which determines abnormality of a temperature sensor based on a comparison result by the comparison unit.

According to a second aspect of the present invention, in the abnormality determination apparatus as described in the first aspect, the comparison unit may compare at least any of absolute value of temperature at every time, relative change amount of temperature since a machining start time, and a change rate of temperature per time.

According to a third aspect of the present invention, the abnormality determination apparatus as described in the first or second aspect may further include a pattern update unit (for example, the "pattern update unit 180" described later) which causes the acquired pattern to be stored in the temperature pattern storage unit as the normal pattern, in a case of determining the temperature sensor as not being abnormal by way of the abnormality determination unit.

According to a fourth aspect of the present invention, the abnormality determination apparatus as described in the first or second aspect may further include a pattern update unit which causes the acquired pattern to be stored in the temperature pattern storage unit to be associated with the machining classification as the normal pattern, in a case of the comparison data acquisition unit not being able to extract the normal pattern related to the machining classification determined by the machining classification determination unit.

According to a fifth aspect, of the present invention, in the abnormality determination apparatus as described in any one of the first to fourth aspects, the abnormality determination apparatus may be provided to the machine tool, and further include: a notification unit (for example, the "notification unit 170" described later) which notifies of abnormality, in a case of being determined as the temperature sensor being abnormal by way of the abnormality determination unit; and a machining control unit which controls machining operation of the machine tool, based on notification by the notification unit.

A sixth aspect of the present invention may be a non-transitory computer readable medium encoded with a program for causing a computer to function as the abnormality determination apparatus as described in any one of the first to fifth aspects.

An abnormality determination system according to a seventh aspect of the present invention includes the abnormality determination apparatus as described in the fifth aspect, in which the abnormality determination apparatus may be communicably connected to a plurality of other machine tools, and the temperature pattern storage unit may store the normal pattern for a machining classification of each of the plurality of other machine tools.

An abnormality determination system (for example, the "abnormality determination system 1000" described later) according to an eighth aspect of the present invention includes the abnormality determination apparatus (for example, the "abnormality determination apparatus 100-2" described later) as described in any one of the first to fourth aspects, in which the abnormality determination apparatus may be a server communicably connected to a plurality of the machine tools, and the temperature pattern storage unit may store the normal pattern for a machining classification of each of the plurality of machine tools.

An abnormality determination method according to a ninth aspect of the present invention for a temperature sensor (for example, the "temperature sensor 200" described later) in a machine tool (for example, the "machine tool 1" described later) includes: determining whether a temperature sensor is abnormal by way of a computer (for example, the "abnormality determination apparatus 100" described later), which is provided with a temperature pattern storage unit (for example, the "temperature pattern storage unit 130" described later) that stores a normal pattern indicating temperature change relative to machining time for a machining classification of the machine tool, comparing an acquired pattern indicating temperature change relative to machining time according to temperature data outputted by the temperature sensor provided to the machine tool in relation to equivalent machining classification, and the normal pattern stored in the temperature pattern storage unit.

According to the present invention, it is possible to provide an abnormality determination apparatus, a non-transitory computer readable medium encoded with a program, abnormality determination system and abnormality determination method which can simply detect abnormality of a temperature sensor in a machine tool, without incurring cost.

DETAILED DESCRIPTION OF THE INVENTION

Embodiment

First, a summary of an embodiment of the present invention will be explained. The present embodiment relates to a system for determining an abnormality in a temperature sensor by comparing an acquired pattern according to temperature data acquired from temperature sensors provided to machine tools which perform machining processes, and a normal pattern indicating the temperature change relative to machining time in a machining classification stored in advance. Herein, the acquired pattern shows the temperature change relative to machining time from the acquired temperature data.

Figure 1:
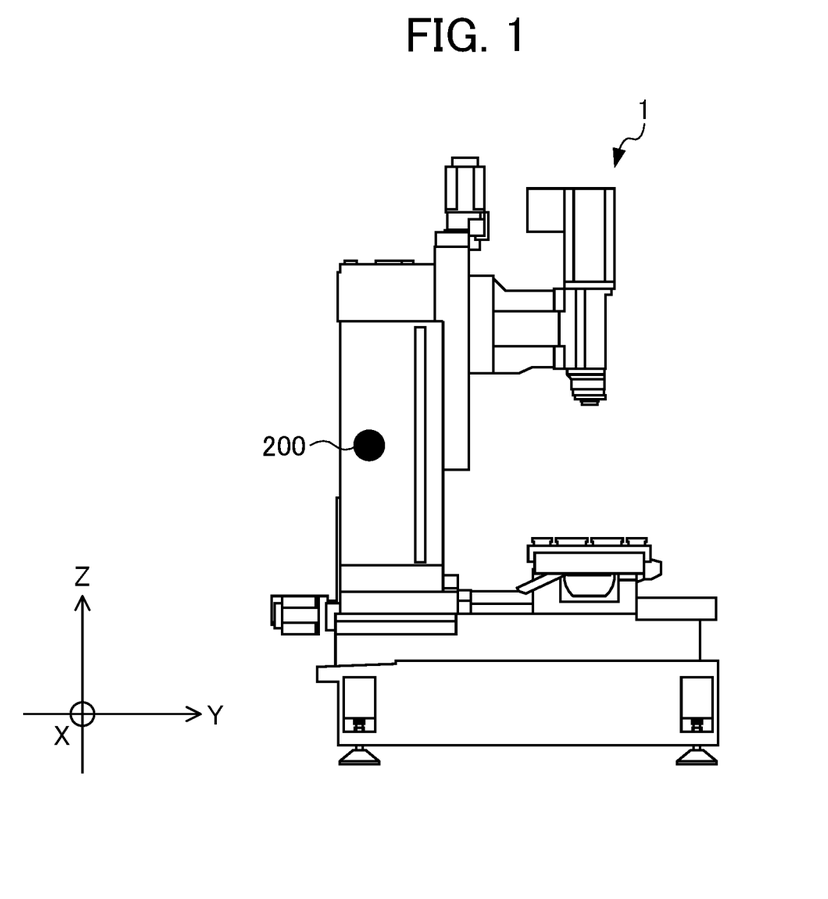
FIG. 1 is a schematic diagram representing the basic configuration of a machine tool of the present embodiment.

Next, an explanation will be made for the configuration of a machine tool 1 which is the present embodiment referencing FIGS. 1 to 3. The machine tool 1 shown in FIG. 1 is a machine which performs predetermined machining such as cutting on a workpiece such as a component, based on operation commands outputted by a numerical control device (not shown). In this example, the machine tool 1 is explained as having three translational axes (X, Y, Z axes) which are orthogonal to each other as drive shafts; however, it is not limited thereto.

A temperature sensor 200 is mounted to the machine tool 1. Herein, a configuration in which one temperature sensor 200 is provided to each of the machine tools 1 will be explained as an example in FIG. 1; however, there is no limitation to the number of temperature sensors 200 provided to the machine tool 1. The temperature sensor 200 detects the temperature of the machine tool 1. The temperature sensor 200 tends to receive or hardly receives the influence of heat generation depending on the mounting position of the machine tool 1. For example, the temperature sensor 200 mounted to the motor and at a position in the vicinity thereof tends to receive the influence of heat generation. On the other hand, the temperature sensor 200 mounted at a position sufficiently distanced from the motor or a connection position thereof hardly receives the influence of heat generation. Furthermore, the temperature sensor 200 mounted at a position sufficiently distanced from the motor or a connection position thereof and not receiving the influence of cutting fluid will hardly receive the influence of heating and cooling.

The temperature sensor 200 is a thermistor or the like, and outputs a temperature detection signal. The machine tool 1 digitizes the temperature detection signal by a known method, and obtains temperature data representing the temperature by a numerical value.

Figure 2:
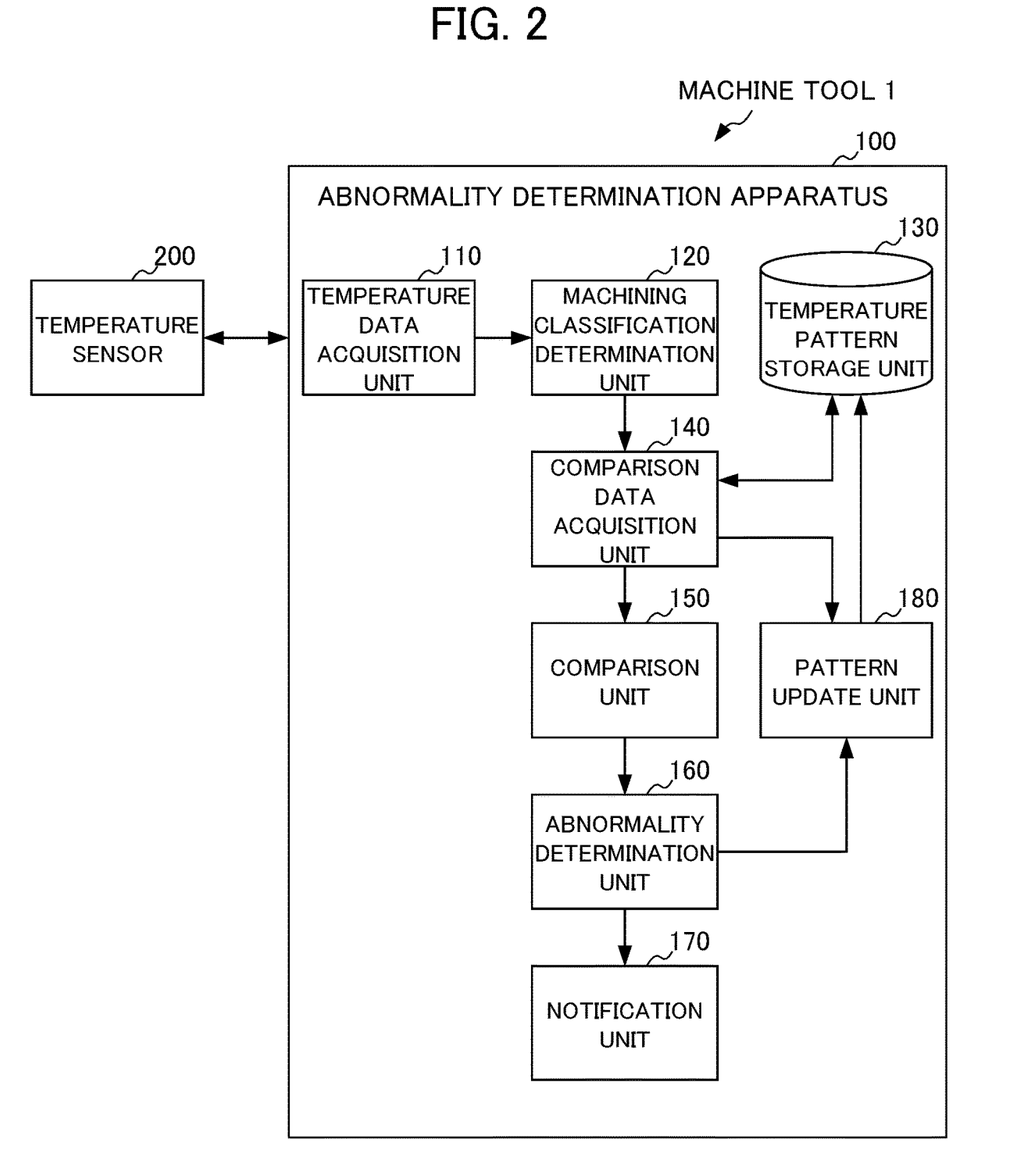
FIG. 2 is a block diagram of the machine tool of the present embodiment.

As shown in FIG. 2, the machine tool 1 includes an abnormality determination apparatus 100. The abnormality determination apparatus 100 acquires temperature data from the temperature detection signal of the temperature sensor 200, and compares an acquired pattern indicating the temperature change relative to machining time from the acquired temperature data, and a normal pattern stored in a temperature pattern storage unit 130 and indicating the temperature change relative to machining time of machining classification of a determined machine tool. Then, the abnormality determination apparatus 100 determines an abnormality of the temperature sensor 200 according to the results of the comparison. The abnormality determination apparatus 100 includes a temperature data acquisition unit 110, machining classification determination unit 120, temperature pattern storage unit 130, comparison data acquisition unit 140, comparison unit 150, abnormality determination unit 160, notification unit 170, and pattern update unit 180.

The temperature data acquisition unit 110 acquires temperature data based on the temperature detection signal sent by the temperature sensor 200 provided to the machine tool 1. The machining classification determination unit 120 determines the machining classification according to a predetermined criterion set in advance. The predetermined criterion, for example, is based on any of the program number of a program in execution, operating state data related to an operating state, machining time or the like, or a combination of these; however, these are merely examples, and are not to be limited thereto. Herein, the operating state data, for example, is an internal behavior signal of a numerical control device (not shown) acquired at predetermined sampling periods (for example, 1 msec) in time sequence, feed axis control data detected from the motor (not shown) of the machine tool 1, spindle control data related to the spindle, etc.

Figure 3:
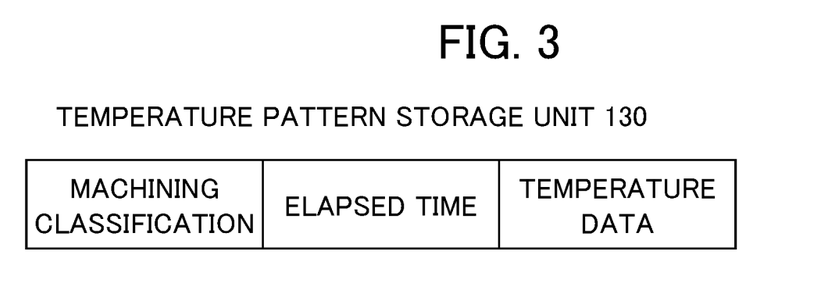
FIG. 3 is a view showing an example of a temperature pattern storage unit of the machine tool of the present embodiment.
Figure 4:
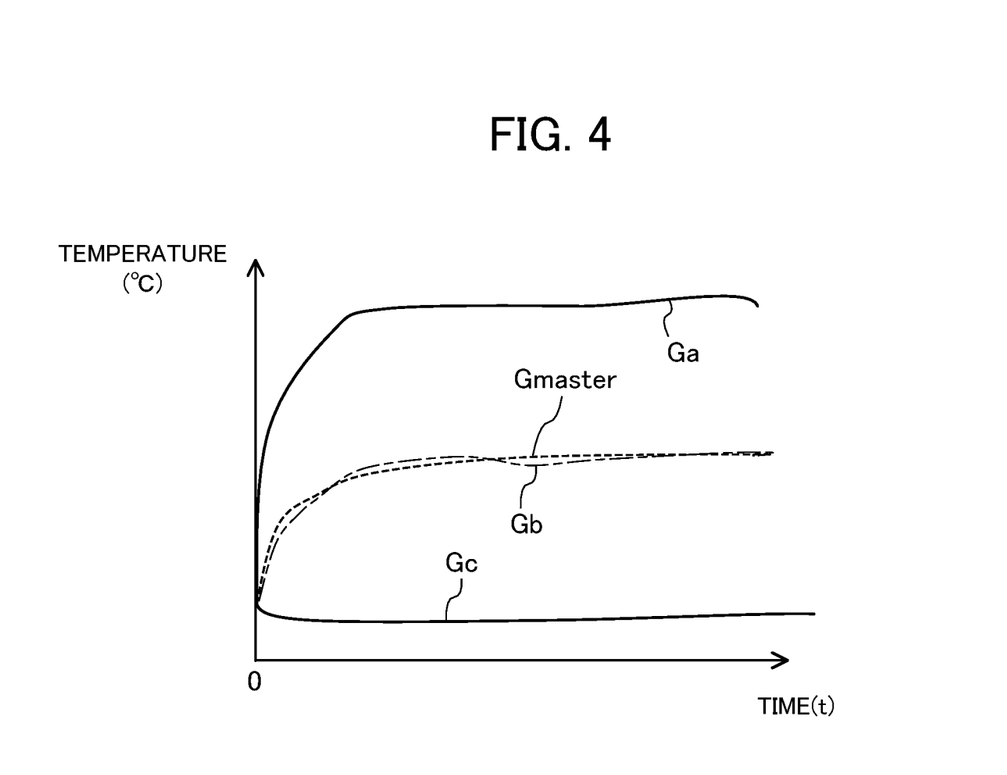
FIG. 4 is a view showing the relationship between a machining start time and temperature according to the present embodiment.

The temperature pattern storage unit 130 stores the machining classification, elapse time, and temperature data to be associated, as shown in FIG. 3. Herein, the abnormality determination apparatus 100 can express, as a graph, the normal pattern showing the temperature change relative to machining time, from the elapse time and temperature data of the machining classification stored in the temperature pattern storage unit 130. For example, FIG. 4 shows a normal pattern based on elapse time and temperature data of a machining classification stored in the temperature pattern storage unit 130 as a graph Gmaster. The temperature pattern storage unit 130 may further store this normal pattern to be associated with the machining classification, elapse time and temperature data.

The comparison data acquisition unit 140 acquires the normal pattern relative to the machining classification determined by the machining classification determination unit 120. More specifically, the comparison data acquisition unit 140 can acquire the normal pattern by extracting temperature data for every elapse time from the temperature pattern storage unit 130. Herein, the machining classification of the normal pattern to be acquired may include an equivalent scope to machining classification of the machine tool 1 having acquired temperature data. Machining classification being equivalent is determined based on a predetermined reference set in advance. The user can arbitrarily set in advance the predetermined reference. It should be noted that, in the case of the normal pattern itself being stored in the temperature pattern storage unit 130, it is sufficient for the comparison data acquisition unit 140 to extract the stored normal pattern. Hereinafter, unless otherwise stated, a machining classification which matches the predetermined reference set in advance will be referred to as equivalent machining classification.

The comparison unit 150 compares the normal pattern acquired from the comparison data acquisition unit 140, and the acquired pattern indicating the temperature change relative to machining time from the temperature data acquired by the temperature data acquisition unit 110. The acquired pattern can also be expressed as a graph similarly to the normal pattern. For example, the graph Gb of FIG. 4 shows the acquired pattern. The comparison unit 150 may compare the absolute value of temperature at every time, or may compare the relative change amount of temperature since the machining start time. In addition, the comparison unit 150 may compare the change rate of temperature per unit time.

The abnormality determination unit 160, in the case of the difference being at least the reference value as a result of comparison by the comparison unit 150, determines as the temperature sensor 200 being abnormal. The notification unit 170, in the case of being determined as being abnormal by way of the abnormality determination unit 160, for example, notifies the abnormality of the temperature sensor 200 on a display (not shown) of the machine tool 1.

The pattern update unit 180 causes the acquired pattern to be stored as the normal pattern in the temperature pattern storage unit 130, in the case of not being able to acquire a normal pattern relative to the machining classification determined, in the processing by the comparison data acquisition unit 140. In addition, the pattern update unit 180 causes the acquired pattern to be stored as the normal pattern in the temperature pattern storage unit 130, in the case of not being determined as abnormal by the abnormality determination unit 160.

The functional blocks of the abnormality determination apparatus 100 have been explained above. Next, the realization method of these functional blocks will be explained. In order to realize these functional blocks, the abnormality determination apparatus 100 includes an arithmetic processing unit such as a CPU (Central Processing Unit). In addition, the abnormality determination apparatus 100 includes an auxiliary storage device such as a HDD (Hard Disk Drive) storing various programs for control including the abnormality determination program, and a main storage device such as RAM (Random Access Memory) for storing data which is temporarily necessitated upon the arithmetic processing unit executing a program.

Then, in the abnormality determination apparatus 100, the arithmetic processing unit reads out an application or OS from the auxiliary storage device, and performs arithmetic processing based on this application or OS, while expanding the read application or OS in the main storage device. In addition, based on operation result thereof, the abnormality determination apparatus 100 controls various hardware possessed thereby. The functional blocks of the present embodiment are thereby realized. In other words, the present embodiment can be realized by hardware and software cooperating.

Figure 5:
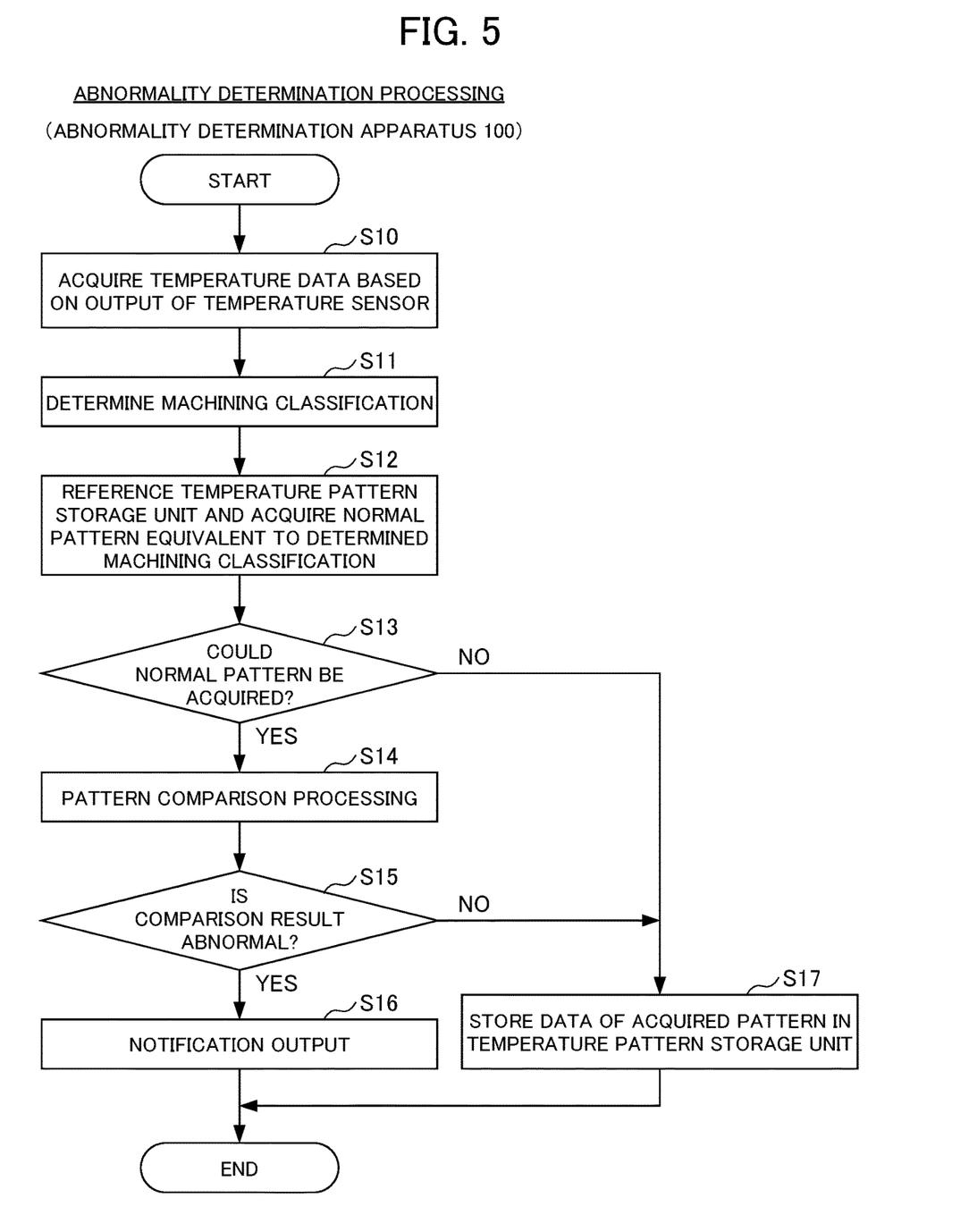
FIG. 5 is a flowchart showing abnormality determination processing by an abnormality determination apparatus of the machine tool according to the present embodiment.

Next, the processing of determining abnormality of the temperature sensors 200 will be explained. FIG. 5 is a flowchart showing the abnormality determination processing by the abnormality determination apparatus 100 of the machine tool 1. In Step S (hereinafter Step S is referred to as simply S) 10 in FIG. 5, the temperature data acquisition unit 110 of the abnormality determination apparatus 100 acquires temperature data based on the temperature detection signal outputted from the temperature sensor 200. Herein, the temperature data acquisition unit 110 continuously acquires temperature detection signals sent from the temperature sensors 200 at the appropriate timing.

In S11, the machining classification determination unit 120 determines the machining classification of the machine tool 1. The machining classification determination unit 120 can determine the machining classification according to a predetermined criterion set in advance. In S12, the comparison data acquisition unit 140 references the temperature pattern storage unit 130, and acquires the normal pattern of the machining classification equivalent to the determined machining classification. Herein, the normal pattern acquired by the comparison data acquisition unit 140 is not limited to one. In the case of a plurality of normal patterns being stored relative to a machining classification, the comparison data acquisition unit 140 acquires a plurality of normal patterns.

In S13, the comparison data acquisition unit 140 judges whether or not it was possible to acquire a normal pattern. If data corresponding to the target machining classification is stored in the temperature pattern storage unit 130, the comparison data acquisition unit 140 can acquire a normal pattern. On the other hand, at a stage at which acquisition of temperature data is seldom carried out by this machine tool 1, the data corresponding to the target machining classification may not be stored in the temperature pattern storage unit 130. In this case, the comparison data acquisition unit 140 cannot acquire a normal pattern. In the case of being able to acquire a normal pattern (S13: YES), the comparison data acquisition unit 140 advances the processing to S14. On the other hand, in the case of not being able to acquire a normal pattern (S13: NO), the comparison data acquisition unit 140 advances the processing to S17.

In S14, the comparison unit 150 performs pattern comparison processing of comparing the acquired pattern indicating the temperature change relative to machining time according to the temperature data acquired by the processing of S10, and the normal pattern acquired by the processing of S12. Herein, the comparison unit 150 may perform comparison between the acquired pattern and normal pattern according to the absolute values of temperature. In addition, the comparison unit 150 may perform comparison by the absolute change amount of temperature since the time of machining start, with the temperature during machining start as 0. Furthermore, the comparison unit 150 may perform the comparison between acquired pattern and normal pattern by the change rate of temperature per time.

In S15, the abnormality determination unit 160 judges whether or not the result of comparison between the acquired pattern and normal pattern is abnormal. Herein, a specific example will be explained based on FIG. 4. FIG. 4 shows an acquired pattern and a normal pattern by the absolute values of temperature of a certain machining classification. Herein, graph Gmaster is the normal pattern, and graphs Ga~Gc are acquired patterns. In this case, if the acquired pattern is graph Gb, the difference from graph Gmaster is small. For this reason, the abnormality determination unit 160 judges that the result of comparison is not abnormal. On the other hand, in the case of the acquired pattern being graph Ga or graph Gc, the difference from graph Gmaster is large. For this reason, the abnormality determination unit 160 judges that the result of comparison is abnormal. The abnormality determination unit 160 may perform judgment as to whether or not the result of comparison is abnormal, for example, according to whether or not the difference is at least a reference value. In the case of the result of comparison being abnormal (S15: YES), the abnormality determination unit 160 advances the processing to S16. On the other hand, in the case of the result of comparison not being abnormal (S15: NO), the abnormality determination unit 160 advances the processing to S17.

In S16, the notification unit 170 outputs a notification of the temperature sensor 200 being abnormal. The notification unit 170, for example, may output the matter of abnormality of the temperature sensor 200 to a display (not shown) of the machine tool 1. Thereafter, the control unit (not shown) which integratedly controls the machine tool 1 ends the present processing. In S17, the pattern update unit 180 causes the data of the acquired pattern indicating the temperature change relative to machining time according to temperature data acquired by the processing of S10 to be stored in the temperature pattern storage unit 130 as a normal pattern. Subsequently, the control unit of the machine tool 1 ends the present processing.

It is thereby possible to easily detect abnormality of a temperature sensor 200 provided to the machine tool 1 without incurring cost, by comparing the acquired pattern based on the output of the temperature sensor 200 and the normal pattern of a machining classification equivalent with the acquired pattern.

For example, by performing comparison between the acquired pattern and the normal pattern according to the absolute values of temperature, it is possible to determine as being abnormal if the difference in absolute values is at least the reference value. In addition, by performing comparison between the acquired pattern and the normal pattern according to the absolute change amount in temperature since the time of machining start, it is possible to determine as being abnormal if the difference in absolute change amount is at least the reference value. Furthermore, by performing comparison between the acquired pattern and the normal pattern according to the change rate in temperature per time, it is possible to discriminate as being abnormal if the difference in change rate is at least the reference value.

The abnormality determination apparatus 100 can accumulate many normal patterns, since the acquired pattern is stored in the temperature pattern storage unit 130 as a normal pattern in the case of determining as not being abnormal by comparison. The abnormality determination apparatus 100 causes the acquired pattern to be stored in the temperature pattern storage unit 130 as a normal pattern, in the case of a normal pattern relative to a machining classification not being stored in the temperature pattern storage unit 130. For this reason, it is possible to accumulate a normal pattern which can be the comparison target in the case of comparing next.

The programs including the abnormality determination program used in the present invention can be stored using various types of non-transitory computer readable media, and supplied to a computer. Non-transitory computer readable media includes various types of tangible storage media. Examples of non-transitory computer readable media include magnetic media (for example, flexible disks, magnetic tape, hard disk drive), magneto-optical recording media (for example, magneto-optical disk), CD-ROM (Read Only Memory), CD-R, CD-R/W, and semiconductor memory (for example, mask ROM, PROM (Programmable ROM), EPROM (Erasable PROM), flash ROM, RAM (random access memory)). In addition, the program may be provided to a computer by way of various types of transitory computer readable media. Examples of transitory computer readable media include electrical signals, optical signals and electromagnetic waves. Transitory computer readable media can provide programs to a computer via wired communication paths such as electrical wires and optical fiber, or a wireless communication path.

In addition, the aforementioned embodiment is a preferred embodiment of the present invention; however, it is not to limit the scope of the present invention to only the above-mentioned embodiment, and realization is possible in a form achieved by conducting various modifications in a scope not departing from the gist of the present invention.

MODIFIED EXAMPLE 1

In the aforementioned embodiment, a configuration which notifies in the case of being determined that the temperature sensor 200 is abnormal has been explained as an example; however, it is not limited thereto. It may be configured so that the machining control unit of the machine tool 1 controls the machining operation based on the notification from the notification unit 170. More specifically, the machining control unit of the machine tool 1 may stop the machining operation. If configured in this way, it is done without performing estimation of the thermal displacement amount using the output from an erroneous temperature sensor 200, and can prevent machining which imparts a bad influence beforehand.

MODIFIED EXAMPLE 2

Figure 6:
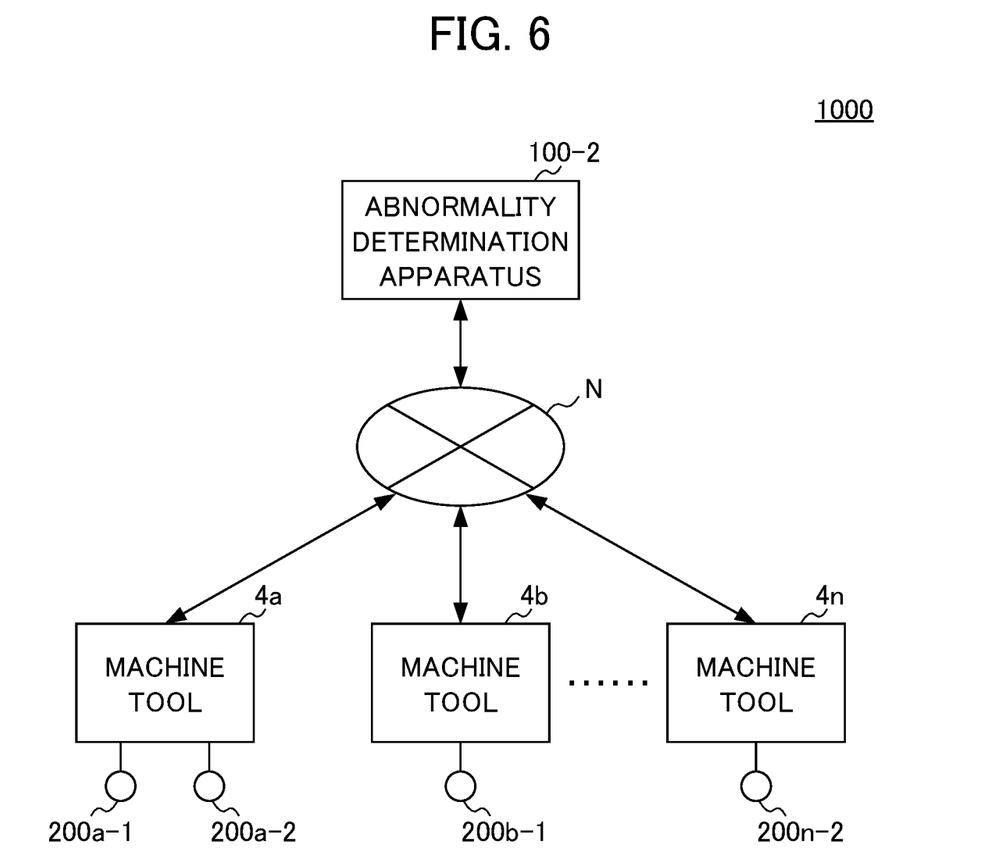
FIG. 6 is a schematic diagram representing the basic configuration of an abnormality determination system according to a modified embodiment.

In the aforementioned embodiment, processing by one machine tool 1 was explained; however, it is not limited thereto. For example, in the case of the unit types of the plurality of machine tools being equivalent, and performing equivalent machining operations, it is possible to determine abnormality by the abnormality determination apparatus (server) which is communicably connected to the plurality of machine tools. Herein, unit types being equivalent is judged based on a predetermined reference set in advance. Herein unit type, for example, indicates the model number, version, options, etc. of the machine tool. For example, equivalent unit types refers to the unit type being the same, and may include slight version differences such as differences in options. It should be noted that this is an example, and is not limited thereto. The user can arbitrarily set in advance the predetermined reference. In addition, machining operations being equivalent is judged based on the predetermined reference set in advance. For example, as the equivalent machining operations, it includes equivalent machining programs, and may be able to perform equivalent machining simultaneously by way of the equivalent machining programs. Herein, for example, equivalent machining programs, in addition to the machining programs being identical, may include machining programs which are version differences in program and have substantially the same processing. FIG. 6 relates to the abnormality determination system 1000 in which an abnormality determination apparatus 100-2 (server) connected via a communication network N to a plurality of machine tools 4 determines abnormality for the temperature sensors of the plurality of machine tools 4 (4a, 4b, ... 4n). Herein, the communication network N, for example, is a LAN (Local Area Network) constructed within a factory, internet, public telephone network, etc. or a combination of these. The specific communication method of the communication network N, and whether being either of a wired connection and wireless connection, etc. are not particularly limited. In addition, the temperature sensors 200 (200a-1, 200a-2, 200b-1, ... , 200n-2) mounted to each machine tool 4, if the branch number (−1 or −2) is the same, indicates being the same mounting position. Then, the abnormality determination apparatus 100-2 can determine abnormality of the temperature sensor 200 of the machine tool 4 using a normal pattern of the temperature sensor 200 of another machine tool 4 having the same mounting position of the temperature sensor 200 of this machine tool 4. Consequently, it is possible to share the normal pattern with a plurality of machine tools 4 by the abnormality determination system 1000.

MODIFIED EXAMPLE 3

In addition, another at least one machine tool may be communicably connected to the machine tool 1 of the aforementioned embodiment, and abnormality of the temperature sensor may be determined by receiving temperature data associated with the machining classification and time elapse of the other machine tools. In this case, when the mounting position of the temperature sensor of the other at least one machine tool is the same as the mounting position of the temperature sensor 200 of the machine tool 1, for the acquired pattern of the other machine tool, it is possible to use the normal pattern of the machine tool 1, which is convenient. In addition, in the case of the mounting position of temperature sensors, unit type and machining operation of other machine tools differing from the machine tool 1, so long as the mounting position, unit type and machining operation being further stored to be associated in the temperature pattern storage unit, it is possible to use the normal pattern of the temperature pattern storage unit by a machine tool of the same mounting position, unit type and machining operation, which is convenient.

EXPLANATION OF REFERENCE NUMERALS 1, 4, 4a, 4n machine tool
100, 100-2 abnormality determination apparatus
110 temperature data acquisition unit
120 machining classification determination unit
130 temperature pattern storage unit
140 comparison data acquisition unit
150 comparison unit
160 abnormality determination unit
170 communication unit
180 pattern update unit
200, 200a-1, 200a-2, 200b-1, ... , 200n-2 temperature sensor
1000 abnormality determination system.

What is claimed is:
1. An abnormality determination apparatus which determines abnormality of a temperature sensor in a machine tool, the abnormality determination apparatus comprising:
a temperature pattern storage unit which stores at least one normal pattern indicating temperature change rela- tive to machining time since a machining start time for every machining classification of the machine tool;
a temperature data acquisition unit which acquires temperature data since the machining start time outputted by the temperature sensor provided to the machine tool;
a machining classification determination unit which determines a machining classification of the machine tool in accordance with a predetermined determination criterion set in advance;
a comparison data acquisition unit which extracts the at least one normal pattern relative to a machining classification determined by the machining classification determination unit from the temperature pattern storage unit;
a comparison unit which compares the at least one normal pattern extracted by the comparison data acquisition unit, and an acquired pattern indicating temperature change relative to machining time according to the temperature data acquired by the temperature data acquisition unit; and
an abnormality determination unit which determines abnormality of a temperature sensor based on a comparison result by the comparison unit.

2. The abnormality determination apparatus according to claim 1, wherein the machining classification determination unit determines the machining classification, based on at least any of information related to a program being executed by the machine tool, information related to an operating state of the machine tool, and a length of machining time since a machining start time.

3. The abnormality determination apparatus according to claim 1,
wherein the comparison unit compares at least any of absolute value of temperature at every time, relative change amount of temperature since a machining start time, and a change rate of temperature per time.

4. The abnormality determination apparatus according to claim 1,
further comprising a pattern update unit which causes the acquired pattern to be stored in the temperature pattern storage unit as the normal pattern, in a case of determining the temperature sensor as not being abnormal by way of the abnormality determination unit.

5. The abnormality determination apparatus according to claim 1,
further comprising a pattern update unit which causes the acquired pattern to be stored in the temperature pattern storage unit to be associated with the machining classification as the normal pattern, in a case of the comparison data acquisition unit not being able to extract the normal pattern related to the machining classification determined by the machining classification determination unit.

6. The abnormality determination apparatus according to claim 1,
wherein the abnormality determination apparatus is provided to the machine tool, and further comprises:
a notification unit which notifies of abnormality, in a case of being determined as the temperature sensor being abnormal by way of the abnormality determination unit; and
a machining control unit which controls machining operation of the machine tool, based on notification by the notification unit.

7. A non-transitory computer readable medium encoded with a program for causing a computer to function as the abnormality determination apparatus according to claim 1.

8. An abnormality determination system comprising the abnormality determination apparatus according to claim 6,
wherein the abnormality determination apparatus is communicably connected to a plurality of other machine tools, and
wherein the temperature pattern storage unit stores the at least one normal pattern for every machining classification of each of the plurality of other machine tools.

9. An abnormality determination system comprising the abnormality determination apparatus according to claim 1,
wherein the abnormality determination apparatus is a server communicably connected to a plurality of the machine tools, and
wherein the temperature pattern storage unit stores the at least one normal pattern for every machining classification of each of the plurality of machine tools.

10. An abnormality determination apparatus which determines abnormality of a temperature sensor in a machine tool, the abnormality determination apparatus comprising:
a temperature pattern storage unit which stores a normal pattern indicating temperature change relative to machining time for a machining classification of the machine tool;
a temperature data acquisition unit which acquires temperature data outputted by the temperature sensor provided to the machine tool;
a machining classification determination unit which determines a machining classification of the machine tool;
a comparison data acquisition unit which extracts the normal pattern relative to a machining classification determined by the machining classification determination unit from the temperature pattern storage unit;
a comparison unit which compares the normal pattern extracted by the comparison data acquisition unit, and an acquired pattern indicating temperature change relative to machining time according to the temperature data acquired by the temperature data acquisition unit;
an abnormality determination unit which determines abnormality of a temperature sensor based on a comparison result by the comparison unit; and
a pattern update unit which causes the acquired pattern to be stored in the temperature pattern storage unit to be associated with the machining classification as the normal pattern, in a case of the comparison data acquisition unit not being able to extract the normal pattern related to the machining classification determined by the machining classification determination unit.

11. An abnormality determination method of a temperature sensor in a machine tool, the method comprising:
determining whether a temperature sensor is abnormal by way of a computer, which is provided with a temperature pattern storage unit that stores at least one normal pattern indicating temperature change relative to machining time since a machining start time for every machining classification of the machine tool;
determining a machining classification of the machine tool in accordance with a predetermined determination criterion set in advance; and
comparing an acquired pattern indicating temperature change relative to machining time according to temperature data since the machining start time outputted by the temperature sensor provided to the machine tool, and the at least one normal pattern related to the machining classification thus determined, stored in the temperature pattern storage unit.

* * * * *